United States Patent
Müller (10) Patent No.: US 12,397,487 B2
(45) Date of Patent: Aug. 26, 2025

(54) METHOD FOR PRODUCING A COMPONENT HAVING A COOLING CHANNEL SYSTEM

(71) Applicant: DMG MORI Ultrasonic Lasertec GmbH, Stipshausen (DE)

(72) Inventor: Andreas Müller, Weitnau (DE)

(73) Assignee: DMG MORI Ultrasonic Lasertec GmbH, Stipshausen (DE)

( * ) Notice: Subject to any disclaimer, the term of this patent is extended or adjusted under 35 U.S.C. 154(b) by 281 days.

(21) Appl. No.: 17/927,067

(22) PCT Filed: Jun. 17, 2021

(86) PCT No.: PCT/EP2021/066364
§ 371 (c)(1),
(2) Date: Nov. 22, 2022

(87) PCT Pub. No.: WO2021/255154
PCT Pub. Date: Dec. 23, 2021

(65) Prior Publication Data
US 2023/0286197 A1    Sep. 14, 2023

(30) Foreign Application Priority Data
Jun. 17, 2020   (DE) .................... 10 2020 116 037.2

(51) Int. Cl.
*B29C 45/73*   (2006.01)
*B22F 5/10*    (2006.01)
(Continued)

(52) U.S. Cl.
CPC ............ *B29C 45/7312* (2013.01); *B22F 5/10* (2013.01); *B22F 10/20* (2021.01); *B22F 10/50* (2021.01);
(Continued)

(58) Field of Classification Search
CPC . B29C 45/7312; B29C 33/04; B29C 33/3835; B29C 2045/7318; B23K 26/342;
(Continued)

(56) References Cited

U.S. PATENT DOCUMENTS

| | | |
|---|---|---|
| 2002/0165634 A1 | 11/2002 | Skszek |
| 2018/0079038 A1* | 3/2018 | Rettberg ................. B23P 15/04 |
| 2019/0373772 A1 | 12/2019 | Mayberry et al. |

FOREIGN PATENT DOCUMENTS

| | | |
|---|---|---|
| AU | 2017221880 A1 | 4/2018 |
| CA | 2234365 A1 | 5/1997 |

(Continued)

OTHER PUBLICATIONS

Office Action dated May 17, 2024 for Chinese App. Ser. No. CN 202180043536.X with English summary.
(Continued)

*Primary Examiner* — JaMel M Nelson
*Assistant Examiner* — Erica Hartsell Funk
(74) *Attorney, Agent, or Firm* — Henricks Slavin LLP (57) ABSTRACT

The invention provides a method for producing a component (100) having a cooling channel system, the method comprising: building a first portion (10) of the component (100) by means of the additive, integrally bonded application of a build material; and—introducing a first cavity (11) having an opening into the first portion (10) of the component (100). The method is characterized in that it also comprises: covering the opening of the first cavity (11) in the first portion (10) by means of a covering part (13);—building a second portion (20) of the component (100) by means of the additive, integrally bonded application of the build material, the build material being applied to the first portion (10) and to the covering part (13); introducing a second cavity (21) having an opening into the second portion (20) of the
(Continued)

component (100); and—introducing a connecting channel (90), (90a) into the component (100) by means of material-removing machining in order to form the cooling channel system, the connecting channel (90), (90a) connecting the second cavity (21) of the second portion (20) to the first cavity (11) of the first portion (10) of the component (100).

22 Claims, 8 Drawing Sheets

(51) Int. Cl.
| | |
|---|---|
| *B22F 10/20* | (2021.01) |
| *B22F 10/50* | (2021.01) |
| *B22F 10/66* | (2021.01) |
| *B22F 12/84* | (2021.01) |
| *B23K 26/00* | (2014.01) |
| *B23K 26/342* | (2014.01) |
| *B23P 15/00* | (2006.01) |
| *B29C 33/04* | (2006.01) |
| *B29C 33/38* | (2006.01) |
| *C22C 1/04* | (2023.01) |
| *G05B 19/4099* | (2006.01) |
| *B23K 101/14* | (2006.01) |
| *B23K 103/12* | (2006.01) |
| *B33Y 10/00* | (2015.01) |
| *B33Y 80/00* | (2015.01) |
| *G06F 113/22* | (2020.01) |

(52) U.S. Cl.
CPC .............. *B22F 10/66* (2021.01); *B22F 12/84* (2021.01); *B23K 26/0006* (2013.01); *B23K 26/342* (2015.10); *B23P 15/007* (2013.01); *B29C 33/04* (2013.01); *B29C 33/3835* (2013.01); *C22C 1/0425* (2013.01); *G05B 19/4099* (2013.01); *B22F 2998/10* (2013.01); *B23K 2101/14* (2018.08); *B23K 2103/12* (2018.08); *B29C 2045/7318* (2013.01); *B33Y 10/00* (2014.12); *B33Y 80/00* (2014.12); *G06F 2113/22* (2020.01)

(58) Field of Classification Search
CPC ............ B23K 26/0006; B23K 2101/14; B23K 2103/12; B22F 10/66; B22F 10/20; B22F 10/50; B22F 12/84; B22F 5/10; B22F 2998/10; B23P 15/007; C22C 1/0425; G05B 19/4099; G06F 2113/22
See application file for complete search history.

(56) References Cited

FOREIGN PATENT DOCUMENTS

| | | |
|---|---|---|
| CN | 107848211 A | 3/2018 |
| DE | 19740502 A1 | 3/1999 |
| DE | 19834238 A1 | 2/2000 |
| DE | 102004040929 A1 | 3/2006 |
| DE | 20221730 U1 | 4/2007 |
| DE | 102006017808 A1 | 10/2007 |
| JP | 2005-169786 A | 6/2005 |
| JP | 2016-216790 A | 12/2016 |

OTHER PUBLICATIONS

Office Action dated Feb. 15, 2023 for German App. Ser. No. 10 2020 116 037.2 with English translation.
International Search Report dated Oct. 7, 2021 for PCT App. Ser. No. PCT/EP2021/066364.
Office Action dated Mar. 17, 2021 for German App. Ser. No. 10 2020 116 037.2 with English translation.
DMG Mori, "Additive Manufacturing—LASERTEC 65 3D," Sep. 6, 2016, "cooling element" at 2:45, retrieved on Nov. 11, 2022, www.youtube.com/watch?v=L3CkzQQFZXs.
W. Grzesik, "Hybrid Additive and Subtractive Manufacturing Processes and Systems: A Review", Journal of Machine Engineering, vol. 18, No. 4, Nov. 30, 2018, pp. 5-24.
C. L. Li et al., "Automatic layout design of plastic injection mould cooling system," Computer-Aided Design, Elsevier Publishers BV., vol. 37, No. 7, Jun. 1, 2005, pp. 645-662.

\* cited by examiner

METHOD FOR PRODUCING A COMPONENT HAVING A COOLING CHANNEL SYSTEM

TECHNICAL FIELD

The present invention relates to a method for producing a component having a cooling channel system.

BACKGROUND OF THE INVENTION

A frequently used method in industrial production is, for example, an injection molding method, wherein a liquefied material is injected under pressure into a shaping mold insert or an injection molding tool, where it cools down and returns to a solid state of aggregation.

This primary forming process is often used in the field of plastics processing and enables complex shaping of the product manufactured thereby.

The cooling required to solidify the material is of particular importance in such a process since it has a decisive effect on the process times, among other things.

It is known that such cooling of the injected material advantageously takes place via the mold insert or the injection molding tool. Usually, cooling channels for heat dissipation are provided within the mold insert or the injection molding tool, wherein suitable coolants flow through these cooling channels and thus cool down the mold insert or the injection molding tool and thus the material located therein.

In principle, the manufacture of tools that are exposed to elevated temperatures during use, such as injection molding tools, forming tools, extrusion tools, etc., is complex. In particular, the introduction of cooling channels extending in the tool is often not easy to accomplish due to the usually very complex geometric shapes of the tools since the cooling channels can usually only be introduced into the finished tool by drilling.

In the prior art document DE 10 2004 040 929 A1, for example, a method is described in which a tool with a coolant channel is produced as a component by an additive material-depositing manufacturing process, with a coolant channel being formed inside the tool in the course of the additive construction. The method shown in the document DE 10 2004 040 929 A1 uses the possibilities of additive manufacturing, which are used in particular for components with a high degree of individualization or components with a complex geometry, and therefore makes it possible to provide recesses, among other things, within the component during additive construction.

However, the possibilities of efficiently cooling a component manufactured in this way are limited.

SUMMARY OF THE INVENTION

It is therefore an object of the present invention to provide a method for producing a component with improved heat dissipation.

To achieve this object, a method for producing a component having a cooling channel system according to claim 1 is proposed.

Furthermore, a software-supported computer system configured for the construction of such a component is proposed according to claim 20.

The respective dependent claims relate to preferred embodiments of the method according to the invention or of the data processing system according to the invention, which may be provided individually or in combination.

According to a first aspect of the invention, the method for producing a component with a cooling channel system comprises building a first portion of the component by means of the additive, integrally bonded application of a build material and introducing a first cavity having an opening into the first portion of the component. The method is characterized by further comprising: covering the opening of the first cavity in the first portion by means of a covering part, building a second portion of the component by means of the additive, integrally bonded application of the build material, the build material being applied to the first portion and to the covering part; introducing a second cavity into the second portion of the component and introducing a connecting channel into the component by means of material-removing machining in order to form the cooling channel system, the connecting channel connecting the second cavity of the second portion to the first cavity of the first portion of the component.

Optionally, the covering part may be securely fixed after insertion by applying, for example, an additive build-up welding track. This may be necessary, for example, when a plurality of covering parts are inserted on a workpiece to be 5-axis machined in directions different from gravity in order to prevent them from falling out. Alternatively, a cover plate may also be fixed by spot welding.

The method according to the invention makes it possible to produce components with complex geometric shapes and a cooling channel system extending inside the component in a particularly advantageous manner, said cooling channel system being configured to conduct a coolant and also having a complex geometric shape.

The formation of the cooling channel system extending inside the component takes place while the individual portions of the component are built by means of the additive, integrally bonded application of a build material (=additive build-up) so that the geometric arrangement of the cooling channel system, which is determined by the positions of the cavities and the connecting channel in the component, may be advantageously adapted to the complex final geometry of the component to be produced so that the cooling channel system extends in a manner matching the outer contour surfaces of the component at least in sections, that is to say it follows them at least in sections. Following in sections is to be understood here as meaning an arrangement of the cooling channel system in which a flow direction of the coolant flowing or conducted through the cooling channel system runs essentially in parallel to an outer contour surface of the component.

In the case of complex component geometries, the introduction of such an internal cooling channel system is generally not possible by merely introducing it in the form of bores after the primary shaping process.

Up to now, introducing the bores was limited in conventional methods due to the component geometry and the possibilities of the drilling process so that only cooling channel systems with an extremely simple geometric arrangement could be introduced.

The method according to the invention makes use of the synergy of building by means of the additive, integrally bonded application of a build material (=additive build-up) and material-removing machining to form the cooling channel system extending therein, including by introducing the connecting channel.

The method according to the invention is thus a hybrid manufacturing method with an alternating sequence of additive building steps and material-removing machining steps.

The method according to the invention makes it possible in particular to realize near-net-contour cooling channel systems, as a result of which the heat dissipation can be significantly improved by a coolant flowing therein.

In addition, by introducing a cavity with a larger cross section than the connecting channel, areas of the component that are particularly thermally stressed during use can advantageously be efficiently cooled by the coolant flowing through the cavity.

Covering the opening of the first cavity in the first portion with a covering part that is advantageously planar and/or flat allows the additive building of the second portion by applying the build material, with the first cavity being completely enclosed inside the component and the first cavity having a simple geometric shape with a planar interface or interface geometry facing the second portion.

Closing the opening of a cavity that is completely inside the finished component by purely additive application of the build material (without a covering part) is only possible when certain interface geometries that are configured for this purpose are complied with, which are usually non-planar. Building an interface geometry in the form of a planar interface (without a covering part) is not possible for process.—related reasons, which is why pyramidal or conical interface geometries are usually built by additive application; e.g. in the form of a roof.

Such non-planar interface geometries of the cavities have proven to be disadvantageous in many respects.

On the one hand, such interface geometries represent undesirable stagnation points for a coolant flowing through the cooling channel system and thus also cause deterioration in the heat dissipation effected thereby.

On the other hand, such mostly pointy interface geometries (pyramidal or conical) represent potential weak points in the sense of a predetermined breaking point (notch factor) at which excessive stress peaks may occur within the component in the event of a mechanical load on the component, as a result of which the component may fail at the corresponding point (crack, fracture, plastic deformation, etc.).

Because the component is built in portions according to the invention, the connecting channel may be introduced in a manner that would not be possible after a complete additive build-up of the component.

Here, the connecting channel is advantageously introduced starting from the second cavity in the second portion of the component in the direction of the first cavity in the first portion in order to establish a connection to the first cavity arranged within the component after the second portion has been built, and thus to form the cooling channel system.

For this purpose, access to a tool configured for material-removing machining advantageously takes place via the opening of the second cavity of the second portion. The second cavity preferably has a corresponding geometry that does not prevent the tool from introducing the connecting channel so that, for example, a drill head configured for chip-removing machining can enter the component through the opening in the second cavity without damaging it.

Advantageously, the introduction of the connecting channels, which is at least partially based on material-removing machining, can create a higher surface quality with smoother surface structures of the surfaces of the component adjacent to the connecting channel compared to the other surfaces produced by additive build-up.

Surfaces created by an additive build-up by means of the integrally bonded application of the build material generally have a surface structure or surface quality with greater roughness values and lower surface quality than is the case for a surface created by material-removing machining, in particular chip-removing machining.

The high surface quality of the connecting channel with a smooth surface structure or lower roughness values improves the conduction of a coolant flowing through the connecting channel since there is less flow resistance here. In the case of rough surfaces of channels or lines for flowing, turbulent flows occur in the areas of the surfaces and thus an increase in flow resistance occurs, which accordingly impedes the flow.

By introducing the connecting channel based on material-removing machining, the flow resistance of a coolant flowing through can thus be significantly reduced compared to a connecting channel produced solely by additive build-up, which in turn has a positive effect on heat dissipation since, with a lower flow resistance and otherwise the same boundary conditions (pressure difference, channel cross-section), higher flow rates or flow speeds of the coolant flowing through can be achieved.

In principle, however, it is also possible to introduce the connecting channel in portions using an additive method by omitting corresponding areas when the material is applied.

The method according to the invention is in no way limited to just a first cavity in the first portion and/or just a second cavity in the second portion. Depending on the geometry of the component to be produced, a plurality of cavities, which may be connected to one another across portions via a corresponding number of connecting channels to form the cooling channel system, may be introduced into the individual portions of the component; it is therefore also possible for a plurality of connecting channels to open into a single cavity in order to form the cooling channel system.

It is thus possible, for example, to introduce two separate cavities into the first portion, which, after the second portion has been built, are connected to a cavity introduced into the second portion by introducing two connecting channels. In this case, the two connecting channels both open into the cavity of the second portion and connect it to the two cavities in the first portion.

Alternatively, it would also be possible, for example, to introduce a cavity into the first portion and to connect it to two cavities introduced into the second portion by introducing two connecting channels.

An improvement in the heat dissipation of the component means, among other things, an increase in the cooling rates/cooling speeds of the component when the component is used under thermal stress, e.g. as a tool in a manufacturing process, so that shorter process times or clock times can be achieved. The heat is dissipated by the coolant flowing through the cooling channel system, which absorbs the heat conducted through the component and conducts it outwards or away.

In a preferred embodiment of the method, the first and/or possibly further cavities are introduced after the respective portions have been built by means of material-removing machining at least in sections.

In a particularly preferred embodiment of the method, the material-removing machining for introducing the first and/or the second cavity is chip-removing machining.

The introduction of the cavities by means of chip-removing machining is particularly beneficial since the surfaces of the component adjacent to the cavities have a high surface quality, in particular compared to surfaces created by a purely additive application of the build material, thus reducing the flow resistance within the cooling channel system.

In another preferred embodiment of the method, the first and/or the second cavity is introduced in the course of the build-up of the respective portions by omitting the corresponding areas during the additive, integrally bonded application of a build material.

Due to omission when applying the construction material, the cavities may advantageously already be introduced in the course of the build-up of the respective portions, thus leading to a reduction in the production costs, the production time and to savings in the build material.

In a particularly preferred embodiment of the method, the surfaces of the portions adjacent to the cavities introduced in the course of the construction of the portions are reworked by chip-removing machining.

The chip-removing reworking of said surfaces improves their surface quality, in particular compared to surfaces created by purely additive application of the build material, as a result of which the flow resistance within the cooling channel system can be reduced.

In contrast to the introduction of one of the cavities merely by material-removing machining without prior omission during the additive build-up, tool costs can also be reduced since only one surface is machined and not the entire cavity itself is introduced by material-removing machining.

In a particularly preferred embodiment of the method, this also includes partially or completely covering an opening in the second cavity of the second portion with a covering part and building a further portion of the component by means of the additive, integrally bonded application of a build material, the build material being applied on the second portion and on the covering part of the opening of the second cavity.

As a result, the opening of the second cavity is closed with build material so that the component has a cooling channel system located entirely inside it.

In a particularly preferred embodiment of the method, it further comprises the steps of:

ZS1: Introducing at least one further cavity having an opening into one of the previously built portions of the component, the further cavity being introduced after the build-up of the previously built portion by means of material-removing machining or in the course of the build-up of the previously built portion by means of omissions in the additive, integrally bonded application of the build material.

ZS2: Introducing one or more connecting channels into the component by material-removing machining for the further formation of the cooling channel system, wherein the connecting channel(s) connects the further cavity from step ZS1 with the cavity or cavities previously introduced into the previously built portions of the component.

ZS3: At least partially covering the opening of the further cavity from step ZS1 by means of a covering part.

ZS4: Building one or more further portions of the component by means of the additive, integrally bonded application of the build material, the build material being applied to one or more of the previously built portions and to the covering part of the previous step ZS3.

Optionally, after insertion in step ZS3, the covering part may be securely fixed by applying, for example, an additive build-up welding track. This may be necessary, for example, when a plurality of covering parts are inserted on a workpiece to be 5-axis machined in directions different from gravity in order to prevent them from falling out. Alternatively, a cover plate may also be fixed by spot welding.

In a particularly preferred embodiment of the method, these steps can be repeated several times so that, through several repetitions of the method step sequence ZS1 to ZS4, a component with a plurality of portions and a cooling channel system formed within the component, which consists of a plurality of cavities and a plurality of connecting channels for connecting the plurality of cavities, are produced.

As a result, components with complex geometries, in particular external geometries, and a cooling channel system extending within the component and advantageously adapted to the complex geometry can be produced.

Here, the number of cavities per portion of the component is not limited to one so that individual portions may also have a plurality of introduced cavities which contribute to the advantageous formation of the cooling channel system.

In a particularly preferred embodiment of the method, the material-removing machining for introducing the connecting channel(s) is chip-removing machining.

The chip-removing machining may achieve a high surface quality of the created surfaces of the component adjacent to the connecting channels, in particular compared to surfaces created by purely additive application of the build material, thus reducing the flow resistance within the cooling channel system.

In a particularly preferred embodiment of the method, the additive, integrally bonded application of the build material is carried out by build-up welding with a laser or arc.

In a particularly preferred embodiment of the method, the build material is supplied during application by build-up welding in the form of powder and/or wire.

In a particularly preferred embodiment of the method, in an area around the opening(s) of one or more of the cavities in the respective portions, recessed shoulders adapted by material-removing machining to the geometries of the covering parts configured to cover the respective openings are formed in such a way that the respective covering parts for covering the respective openings are form-fittingly held in position.

This makes the insertion of the covering part(s) to cover the opening(s) and the subsequent additive build-up on the respective covering part easier since the respective covering part is held in position relative to the component and does not shift due to unwanted vibrations or the like.

In a particularly preferred embodiment of the method, one or more of the covering parts are round sheet metal blanks or sheet metal covers.

In a particularly preferred embodiment of the method, geometries of the cavities are selected from a set of predetermined standard geometries of the cavities.

As a result, a largely standardized production can be made possible since no arbitrary geometries are selected for the cavities, but a selection is taken from a set of predetermined standard geometries according to a modular principle. The standardization achieved in this way allows further method steps to be optimized, particularly with regard to the configuration of the covering parts, which in a particularly preferred embodiment of the process are similarly selected from a set of prefabricated covering parts geometrically adapted to the standard geometries of the cavities.

The covering parts can thus be prefabricated in large quantities and, according to the modular principle, can be used directly to cover the cavities with standard geometry.

This leads to a reduction in manufacturing costs since the covering parts do not have to be manufactured individually and, moreover, manufacturing times for manufacturing components can be reduced by the method according to the invention.

In a particularly preferred embodiment, the standard geometries of the cavities have generally cylindrical shapes.

These relatively simple geometries can be introduced quickly and easily by material-removing machining, in particular chip-removing machining, so that the production times can be further reduced.

In a particularly preferred embodiment of the method according to the invention, it comprises introducing at least one feed channel and at least one discharge channel for the cooling channel system into the component by means of material-removing machining, the feed channel and the discharge channel being introduced such that the cooling channel system extends continuously from the feed channel to the discharge channel.

This provides a continuous cooling channel system through which a coolant supplied from outside the component through the feed channel can flow through the cooling channel system inside the component to the discharge channel, and thus a cooling circuit for cooling or dissipating heat from the component can be provided.

In a particularly preferred embodiment of the method, it also comprises additive, integrally bonded application of a wear-resistant outer layer to a part of an outer contour surface of the component built from the build material.

Thus a wear-resistant surface (preferably made of tool steel) that can also withstand greater mechanical stress can be formed in a manner adapted to the later use of the component, e.g. as a tool in other manufacturing and/or production methods.

In a particularly preferred embodiment of the method, the additive, integrally bonded application of the wear-resistant outer layer is carried out by build-up welding with a laser or arc, a material used to build the wear-resistant outer layer being supplied in the form of powder and/or wire.

In a particularly preferred embodiment of the method, the build material also has a thermal conductivity that is greater than a thermal conductivity of the wear-resistant outer layer.

Thus, a component with improved heat dissipation properties and high wear resistance can be provided in an efficient manner. Due to the increased thermal conductivity, thermal energy entering the component via the outer layer is quickly conducted from the surface of the outer layer adjacent to the build material to the cooling channel system so that improved heat dissipation can be achieved within the entire component.

Improved heat dissipation of a component produced by the method according to the invention not only aims to increase the cooling rates but also to achieve local uniformity in the cooling of the component, in particular due to the cavities placed in the course of the method according to the invention in areas of the component that are subjected to particularly heavily thermal stresses, for example.

For example, when the component is used, e.g. as a tool, unwanted deformations caused by locally different cooling rates can be reliably avoided.

For example, the cooling times for injection molded parts can be reduced and the cooling for hot forming tools can be improved in order to prevent increased local wear.

According to a further aspect of the invention, a software-supported computer system is proposed, which is characterized in that the computer system is configured for construction planning of a component to be produced using the method according to the invention and for this purpose comprises at least one means for defining a component geometry of the component having a cooling channel system.

In a particularly preferred embodiment, the computer system further comprises a means for determining successive machining steps that can be carried out by a numerically controlled machine tool and/or a numerically controlled machining center for the production of the component, a means for deriving control commands to be used by the numerically controlled machine tool and/or the numerically controlled machining center for carrying out the machining steps, and a means for transmitting the control commands to the machine tool and/or to the machining center, which are configured to carry out the machining steps for producing the component.

In a particularly preferred embodiment, the computer system further comprises a CAD and/or a CAM system.

Further aspects and advantages thereof as well as more specific exemplary embodiments of the aspects and features mentioned above are described below using the drawings shown in the attached figures.

DETAILED DESCRIPTION OF THE FIGURES

Figure 1A:
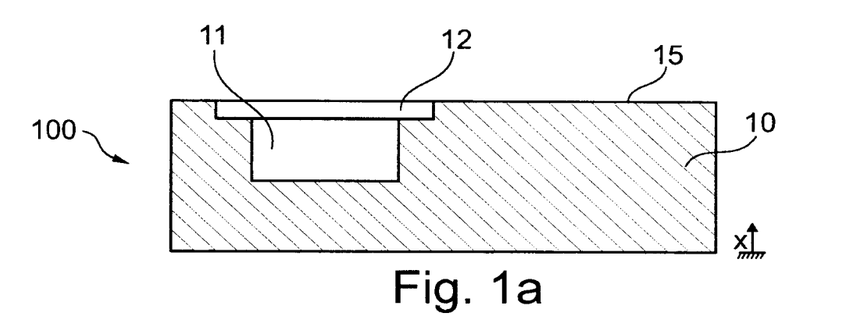
FIGS. 1a-1f show, in exemplary cross sections, the step-by-step production of a component having a cooling channel system using the method according to the invention.

FIG. 1a shows an exemplary component 100 after a build-up of a first portion 10 carried out in the course of the method according to the invention by means of the additive, integrally bonded application of a build material (=additive build-up) in a cross section.

In the given example, the additive build-up takes place along a build direction x.

A first cavity 11 is introduced into the first portion 10 in such a way that it has an opening towards an outer surface 15 of the first portion 10.

The introduction of the first cavity 11 may be carried out in the course of the additive build-up of the first portion 10 by means of recesses at the relevant points, wherein the surfaces of the first portion adjacent to the first cavity 11 are reworked by material-removing machining, in particular chip-removing machining, in order to improve the surface quality and thus reduce the flow resistance in the cooling channel system.

Alternatively, the first cavity 11 may be introduced directly into the solid material following the additive build-up of the first portion 10 by means of material-removing machining, in particular chip-removing machining.

Furthermore, at the opening of the first cavity 11 on the outer surface 15, a shoulder 12 is introduced into the first portion 10 by means of material-removing machining, said shoulder 12 being used for the later insertion of a covering part 13 (see FIG. 1B).

Figure 1B:
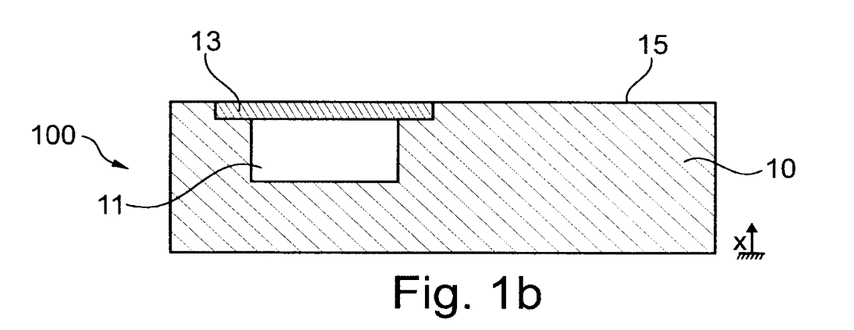

FIG. 1b shows the component after a step of covering the opening of the first cavity 11 with a covering part 13 in cross section.

The covering part 13 is advantageously flat and planar and has a small thickness compared to the other dimensions. The covering part completely closes the opening of the first cavity.

Advantageously, the shoulder 12 introduced into the first portion 10 at the first cavity 11 and the covering part 13 are adapted to one another in terms of shape in such a way that a surface of the flat covering part 12 is flush with the outer surface 15 of the first portion and preferably forms a flat surface together therewith. The covering part 13 is preferably held in a form-fittingly by the shoulder 12 introduced.

Figure 1C:
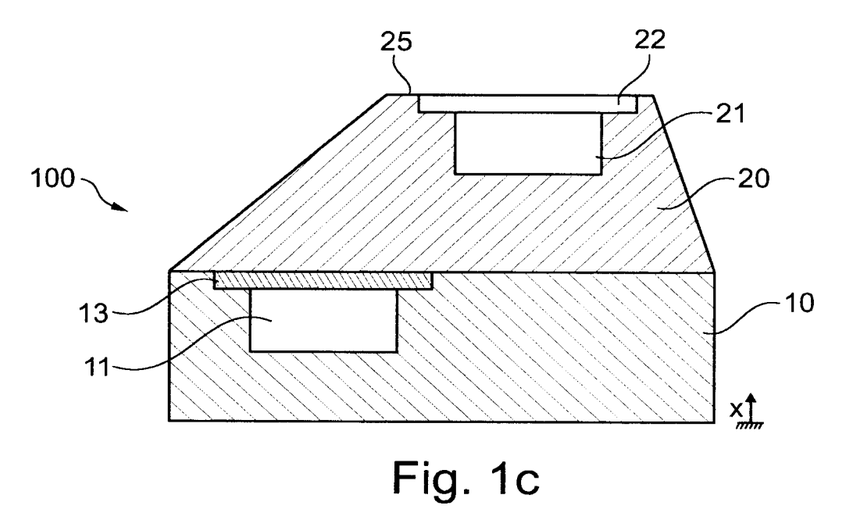

FIG. 1c shows the component 100 after a subsequent method step for the additive build-up of a second portion 20 in cross section.

The additive build-up of the second portion 20 is carried out on the first portion 10 starting from the outer surface 15 of the first portion 10 and the surface of the covering part 13 of the first cavity 11 being flush with the outer surface 15 along the build-up direction x.

By covering the opening of the first cavity 11, the additive build-up of the second portion 20 may also be carried out on the covering part 13, which means that closing the first cavity 11 purely by additive application using complex pyramidal or conical geometries can be omitted and the first cavity 11 thus has a geometric shape with substantially parallel opposite side surfaces or top and bottom surfaces.

The additive build-up of the second portion 20 is carried out as shown in FIG. 1c for the exemplary component 100 starting from the entire outer surface 15 of the first portion 10 and from the surface of the covering part 13 that is flush with the outer surface 15, wherein this is not to be understood as a limitation of the method according to the invention. In general, the second portion may also be built up only on part of the outer surface 15 (and not the entire outer surface) of the first portion 10 of the component 100.

A cavity, a second cavity 21, is also introduced into the second portion 20 of the component 100 by means of material-removing machining using one of the methods already described in the course of the introduction of the first cavity 11 (recesses in the additive build-up and material-removing post-machining or complete introduction by material-removing machining).

Although the illustration in FIG. 1c suggests that the first cavity 11 and the second cavity 21 have the same or similar geometric shape with the same or similar dimensions, this does not generally have to be the case in the method according to the invention.

The second cavity 21 in the second portion 22 is open towards an outer surface 25 of the second portion 20.

Furthermore, in a manner analogous to the procedure in the case of the first cavity 11, a shoulder 22 is introduced at the opening of the second cavity 21 on the outer surface 25 by means of material-removing machining.

Figure 1D:
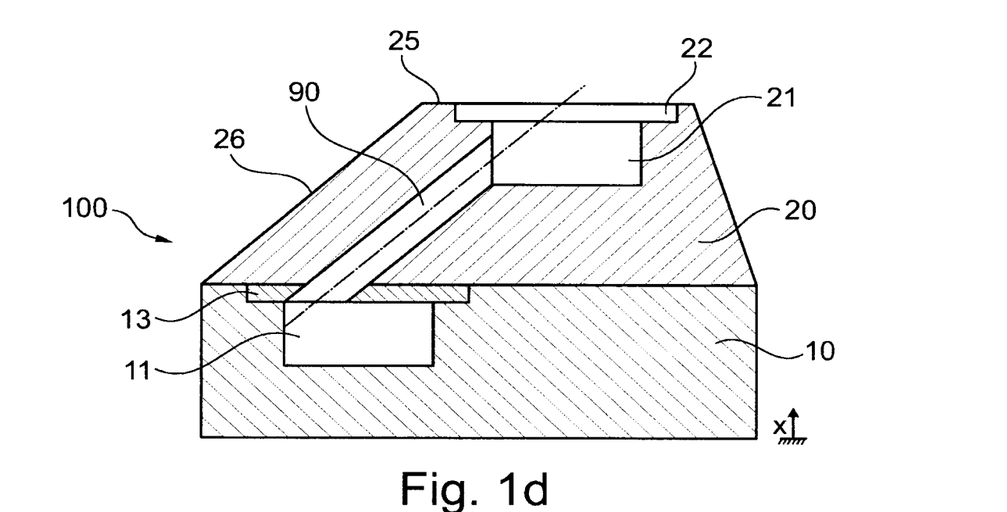

FIG. 1d shows the component 100 after a subsequent method step of introducing a connecting channel 90 in cross section.

The connecting channel 90 is introduced into the component 100 by material-removing machining in such a way that it connects the first cavity 11 of the first portion 10 to the second cavity 21 of the second portion 20.

When the two cavities 11 and 21 are connected by the connecting channel 90 to form a cooling channel system, material is also necessarily removed from the covering part 13 enclosed in the component in the course of the additive build-up since otherwise no connection could be established between the cavities 11 and 21.

The material-removing machining for the introduction of the connecting channel 90 can be carried out, inter alia, by laser machining or chip-removing machining, e.g. using a milling tool or a drill head, with chip-removing machining being preferable due to the high surface quality of the surfaces introduced in this way.

The material-removing machining, e.g. the insertion of a drill head, is carried out starting from the second cavity 22, wherein, due to the fact that the cross-section of the second cavity 21 is larger than the cross-section of the connecting channel 90, the exemplary drill head can easily be guided through the component 100 to the first cavity 11 without damaging the component 100 in an undesired manner, e.g. by collision with the second portion 20 in an area around the second cavity 21.

Furthermore, the relatively large second cavity 22 allows the exemplary drill head to be introduced into the component at an angle, starting from a vertical of the outer surface 25. The possibility of introducing the connecting channel 90 at a corresponding angle of inclination to the vertical of the outer surface 25 (without damaging the second portion 20 in an undesired manner) results in greater flexibility in the formation of a cooling channel system within the component 100.

The connecting channel 90 may thus advantageously be introduced both at steep and at shallow angles of inclination in relation to the vertical of the outer surface 25.

Thus, the connection channel 90 may be routed in parallel (or almost in parallel) to a further outer surface 26 of the component 100 in a partial area of the component 100 in accordance with the illustration in FIG. 1d. The result of this is that in such a sectional area, different surface points of the further outer surface 26 have the same (or almost the same) distance from the connecting channel 90. This distance should advantageously be selected to be as small as possible so that the cooling channel system can be routed close to the outer contour and thus dissipation of heat entering component 100 through the further outer surface 26, for example, by means of the cooling channel system through which a coolant flows can be increased. With such an introduction of the connecting channel 90 as part of the cooling channel system, the component 100 has a largely constant material thickness between the further outer surface 26 and the connecting channel 90 in this partial area, which also means that a locally uniform heat dissipation in the relevant partial area can be achieved, too.

Figure 1E:
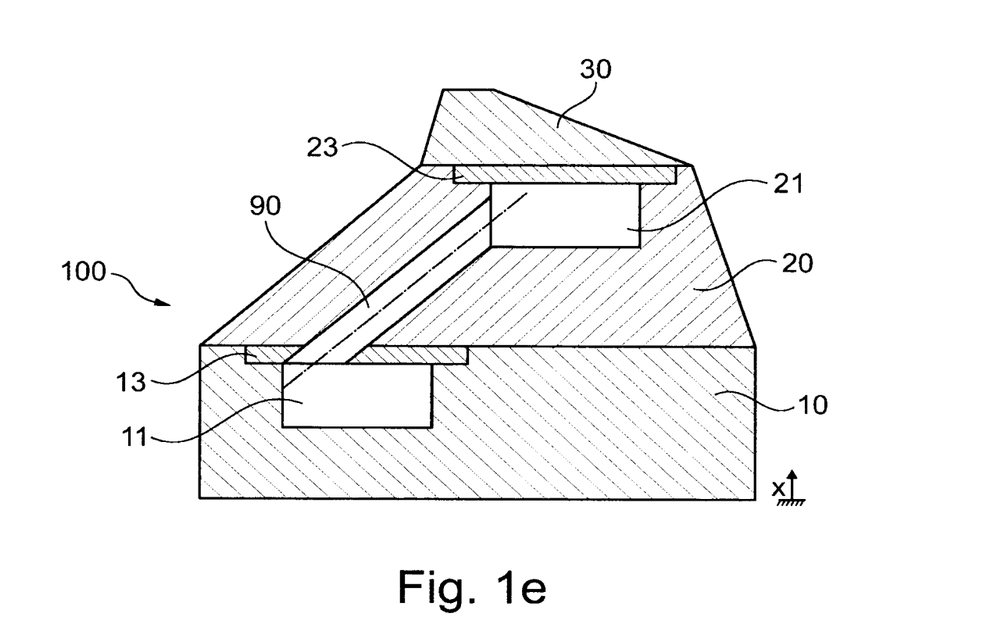

FIG. 1e shows the component 100 after an additive build-up of a further (third) part 30 for finalizing the exemplary component 100 in cross section.

According to the method according to the invention, the opening of the second cavity 21 on the outer surface 25 in the second portion 20 is covered and closed by a covering part 23 adapted to the shoulder 22, with one surface of the covering part terminating flush with the outer surface 25 here as well.

The additive build-up of the third portion 30 is carried out on the second portion 20 starting from the outer surface 25 of the second portion 20 and the surface of the covering part 23 of the second cavity 21 extending flush with the outer surface 25 along the construction direction x.

Figure 1F:
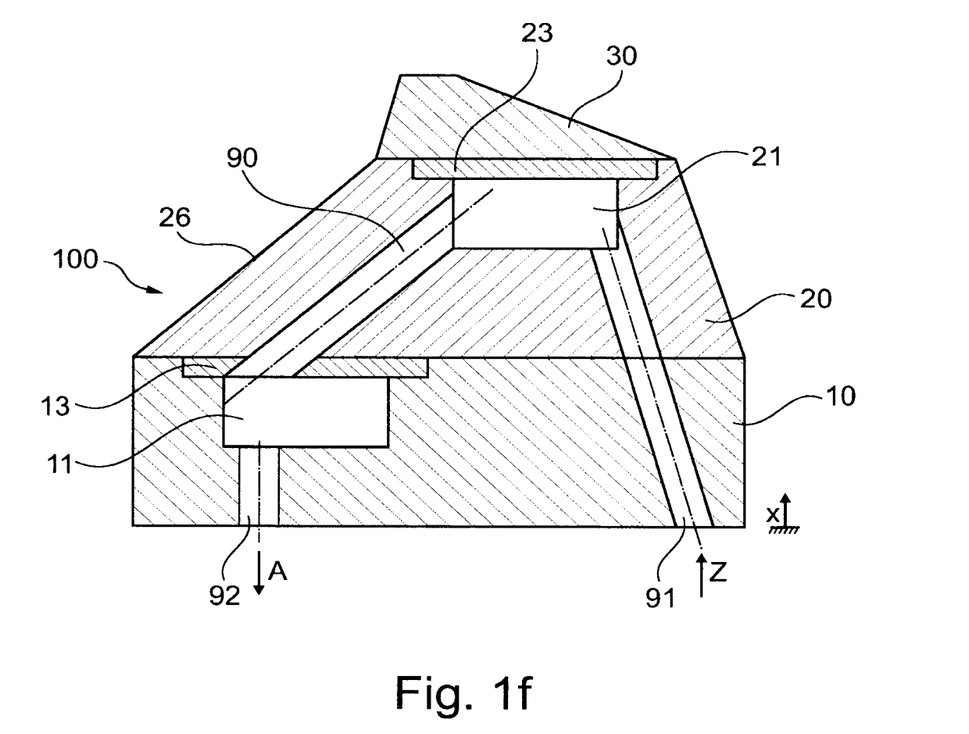

FIG. 1f shows the component 100 after the cooling channel system has been finalized by introducing a feed channel 91 and a discharge channel 92 in cross section.

Introducing the feed and discharge channels 91 and 92 is carried out by material-removing machining, the feed and discharge channels 91 and 92 being introduced into the component 100 in such a way that a later passage of a coolant starting from an inlet Z via the cooling channel system consisting of the cavities 21,22, the connecting channel 90 and the feed and discharge channels 91 and 92 up to an outlet A is possible.

The positions of the inlet Z and the outlet A for the coolant are generally not fixed but may optionally also be swapped so that the flow direction of the coolant flowing through the cooling channel system is opposite to the flow direction shown in FIG. 1*f.*

The feed and discharge channels 91 and 92 may also be routed through the component 100 in such a way that they follow an outer surface of the component 100 at least in sections in order to improve the heat dissipation.

The feed and discharge channels 91 and 92 are advantageously introduced in such a way that the inlet Z and outlet A for the coolant in the cooling channel system of component 100 are located on an outer surface or surfaces (A and Z are not necessarily arranged on the same surface or side of the component).

The component 100 shown in FIG. 1*f* having a finalized cooling channel system makes it clear that a cooling channel system having such a complex geometric structure can in no way be made by material-removing machining, e.g. by drilling, subsequently to the complete build-up of the component 100, here having three portions 10, 20 and 30, but is only achievable by means of the method according to the invention.

Furthermore, the surfaces of the component 100 adjacent to the internal cooling channel system are advantageously introduced or at least reworked by material-removing machining, in particular by chip-removing machining. In this way, a high surface quality of said surfaces can be achieved with less roughness, in particular in comparison to a surface created by a purely additive build-up. In this way, a flow resistance of a coolant flowing through such a cooling channel system can be significantly reduced so that higher flow speeds or higher flow rates can be achieved, in particular in comparison to a cooling channel system produced by purely additive build-up (i.e. without material-removing machining/reworking), which per se would have a lower surface quality and thus a higher flow resistance for the coolant.

Figure 2:
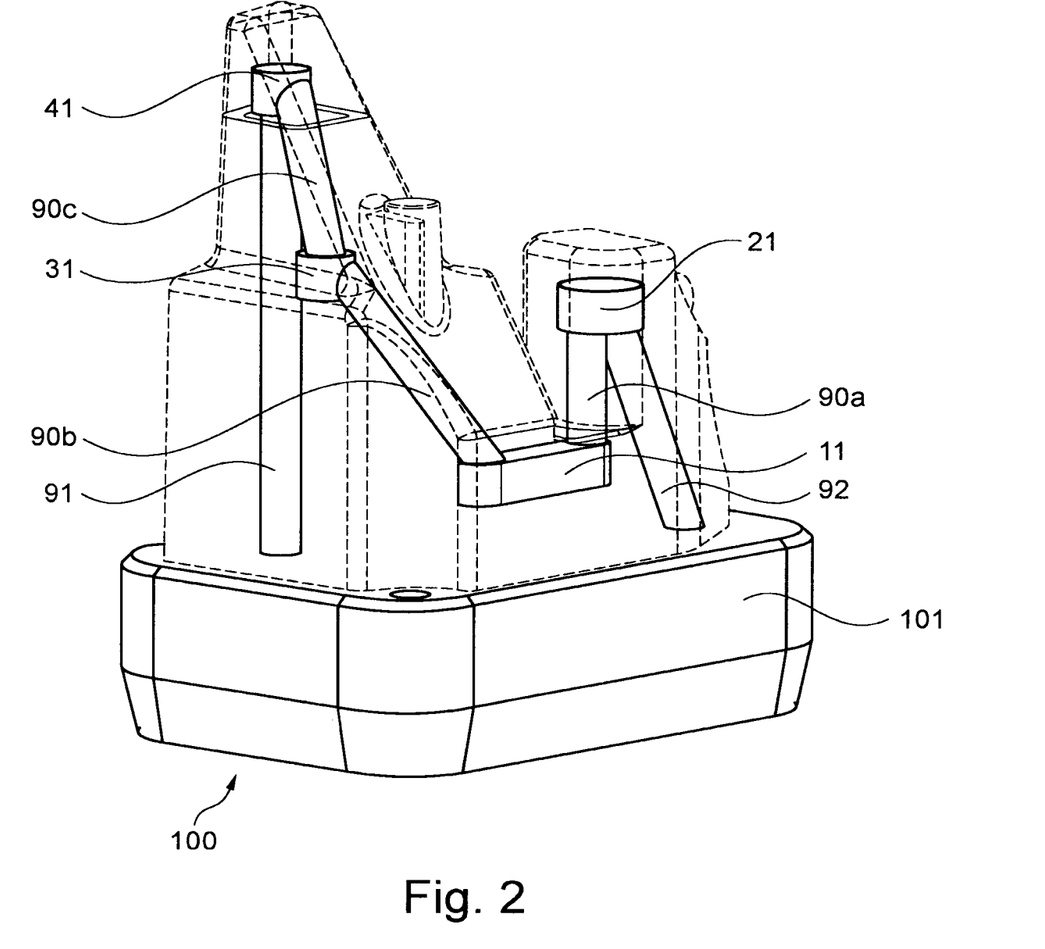
FIG. 2 shows a component having a cooling channel system consisting of a plurality of cavities and connecting channels in a perspective transparent view.

FIG. 2 shows another component with a cooling channel system, which has been completely produced by the method according to the invention and has a plurality of cavities and a number of plurality channels, in a perspective transparent view.

In contrast to the representations in FIGS. 1*a* to 1*f,* FIG. 2 shows a component 100 with a more complex external geometry and a more complex geometry of the cooling channel system extending inside the component 100.

The component 100 is produced using the method according to the invention, wherein, due to the hybrid character of the method consisting of alternating additive build-up steps and material-removing machining steps, a cooling channel system within the component 100 can be formed, due to which the component (with a coolant flow) has improved heat dissipation properties.

The component is built by means of the additive, integrally bonded application of a build material on a base body 101 of the component 101.

In the course of the method according to the invention, a first cavity 11 and a second cavity 21 and two further cavities, a third cavity 31 and a fourth cavity 41, are advantageously introduced into the component, each of which is introduced by chip-removing machining. In addition, the surfaces adjacent to the cavities 11, 21, 31 and 41 may be reworked to improve the surface quality, e.g. by further material-removing machining.

The geometries of the cavities are advantageously selected from a set of standard geometries, said geometries preferably comprising simple cylindrical and/or generally cylindrical geometries of the most varied of dimensions. Generally cylindrical geometries are to be understood as geometries that are formed by extrusion of a base surface of any shape (e.g. circle, ellipse, polygon, etc.) along an extrusion axis.

The second, third and fourth cavities 21, 31 and 41 have cylindrical shapes with a circular cross-section, with the dimensions of the cylindrical shapes of the individual cavities differing both in terms of the diameter of the circular cross-sections and in the heights of the cylinders.

The first cavity 11, on the other hand, has a generally cylindrical shape with a non-circular cross-section.

In the course of the production of the component using the method according to the invention, the cavities 11, 21, 31 and 41 are to one another connected to form the cooling channel system by connecting channels 90*a*, 90*b* and 90*c* which are introduced into the component 100 by material-removing machining, in particular by chip-removing machining.

The connecting channel 90*a* connects the first cavity 11 to the second cavity 21, the connecting channel 90*b* connects the first cavity 11 to the third cavity 31, and the connecting channel 90*c* connects the third cavity 31 to the fourth cavity 41.

A flow direction of a coolant flowing through the cooling channel system would therefore be either in the following sequence second cavity 21→connecting channel 90*a*→first cavity 11→connecting channel 90*b* →third cavity 31→connecting channel 90*c*→fourth cavity 41 or in a correspondingly reversed sequence.

Starting from the base body 101 of the component 100, a feed channel 91 and a discharge channel 92 for the coolant are also introduced into the component 101 by material-removing machining in order to finalize the cooling channel system.

The determination of the feed channel 91 and the discharge channel 92 and thus a flow direction from the feed channel 91 to the discharge channel 92 is not to be understood as definite here since the coolant may also flow through the cooling channel system in a flow direction opposite thereto.

Figure 3A:
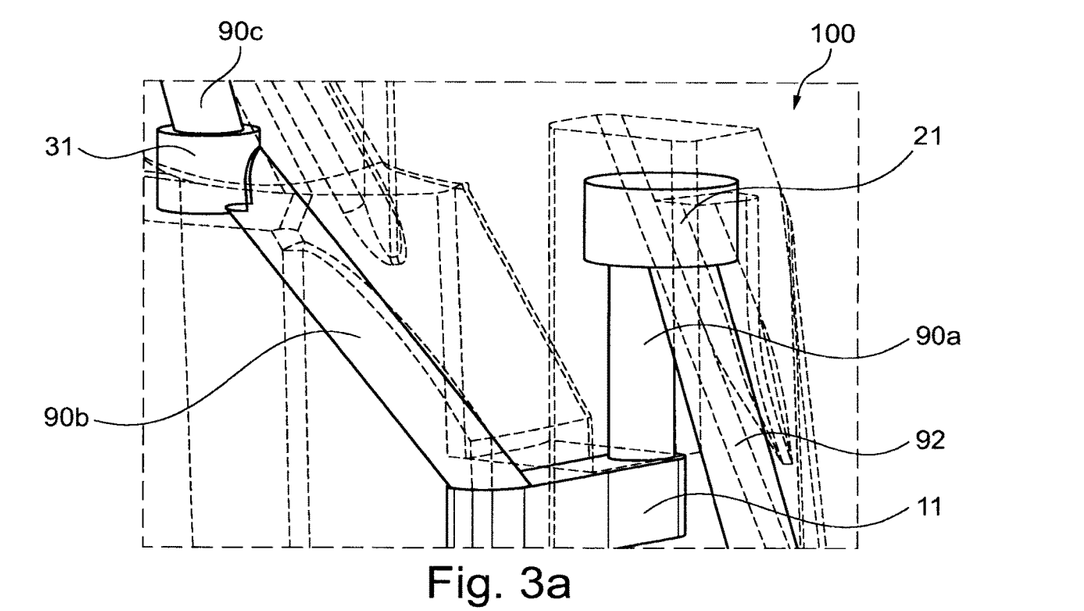
FIGS. 3a-3b show enlarged views of different partial areas of the component having a cooling channel system from FIG. 2.

FIG. 3*a* shows a perspective section of the component from FIG. 2 in a central partial area.

Figure 3B:
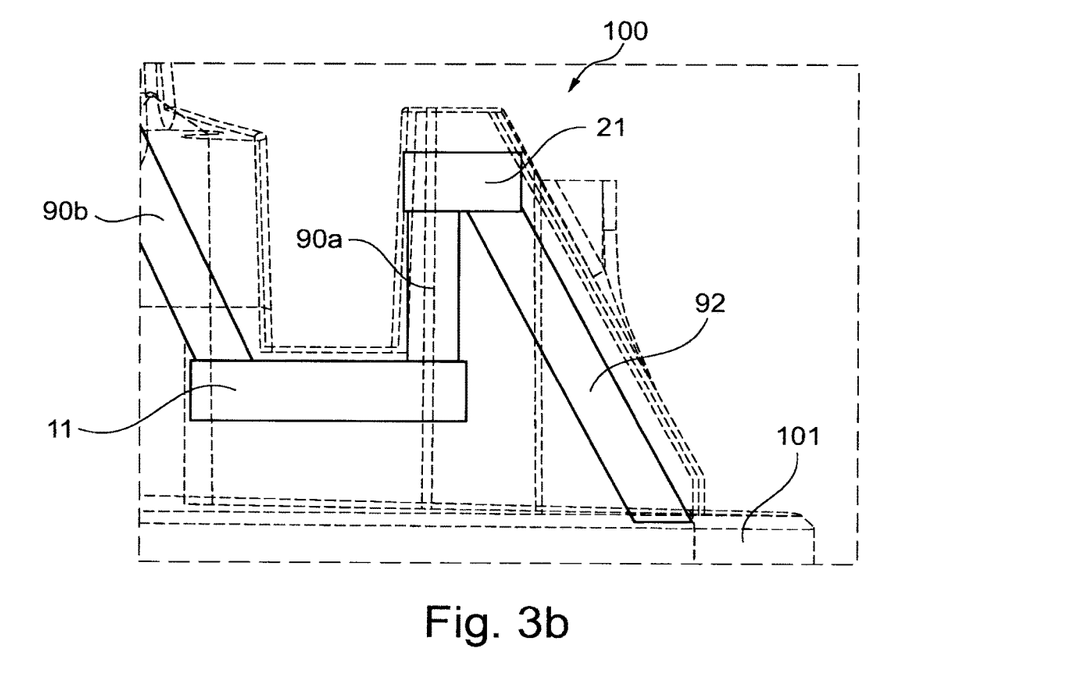

The section shows that the connecting channels 90*a* and 90*b* for connecting the cavities 11, 21 and 31 are introduced into the component 100 in such a way that they follow the outer contours or outer contour surfaces of the component 100 at least in sections; i.e. extend in parallel or approximately in parallel to these, and are thus formed to be near-net-contour FIG. 3*b* shows the section of the component from FIG. 2 shown in FIG. 3*a* in a central partial area in a side view.

The side view shows that, in addition to the connecting channels 90*a* and 90*b* for connecting the cavities 11, 21 and 31, the discharge channel 92 of the cooling channel system is also introduced into the component 100 in such a way that it follows an outer contour or an outer contour surface of the component 100 at least in sections; i.e. extends on parallel or approximately in parallel thereto.

In the illustration shown in FIG. 3b, the discharge channel 92 of the cooling channel system opens into the base body 101, from which the cooling channel system is connected to a coolant supply unit configured to supply the cooling channel system.

Figure 3C:
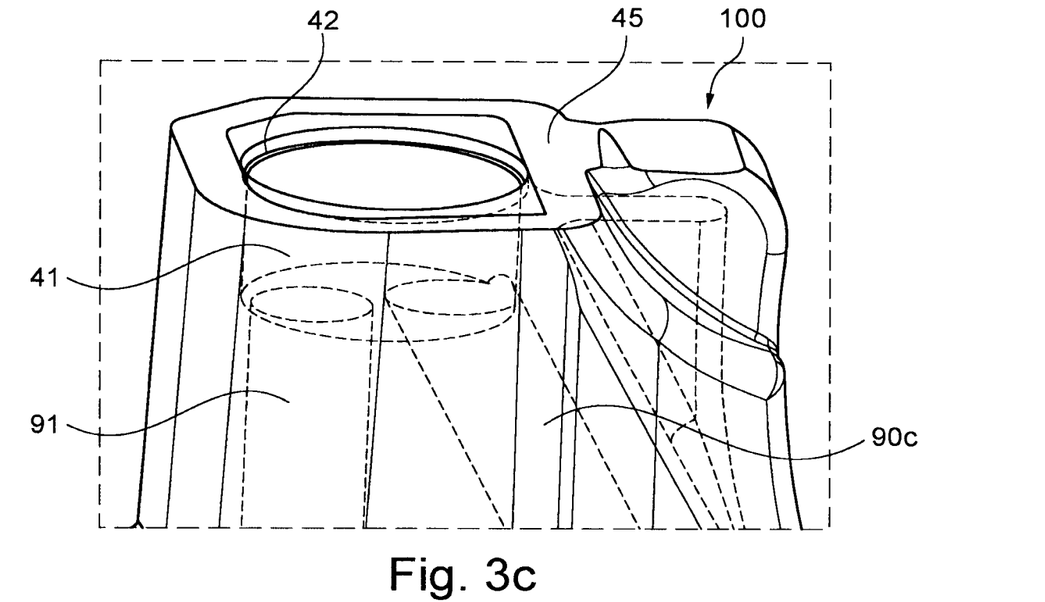

FIG. 3c shows a perspective section of the component from FIG. 2 after an intermediate step of the method according to the invention for producing the component in an upper partial area.

In the illustration shown, the method steps subsequent to the introduction of the fourth cavity 41 of covering the opening of the fourth cavity 41 on an outer surface 45 by means of a covering part 43 (not shown here, see FIG. 3d) as well as an additive build-up of a last portion of the component 100 shown in FIG. 2 on the outer surface 45 have not yet been carried out.

Here, the outer surface 45 is merely an outer surface formed in the course of the previous method steps and is not an outer surface of the finished component in the present case.

Here, the additive build-up of the component has taken place up to the outer surface 45.

Furthermore, at the opening of the fourth cavity 41 on the outer surface 45, a shoulder 42 configured to receive the covering part 43 (not shown here) is introduced by material-removing machining, in particular by chip-removing machining.

The geometric shape of the shoulder 42 is adapted to the cylindrical shape of the fourth cavity and is configured such that the covering part 43 placed in the course of the subsequent method steps is held in position in a form-fitting manner.

Figure 3D:
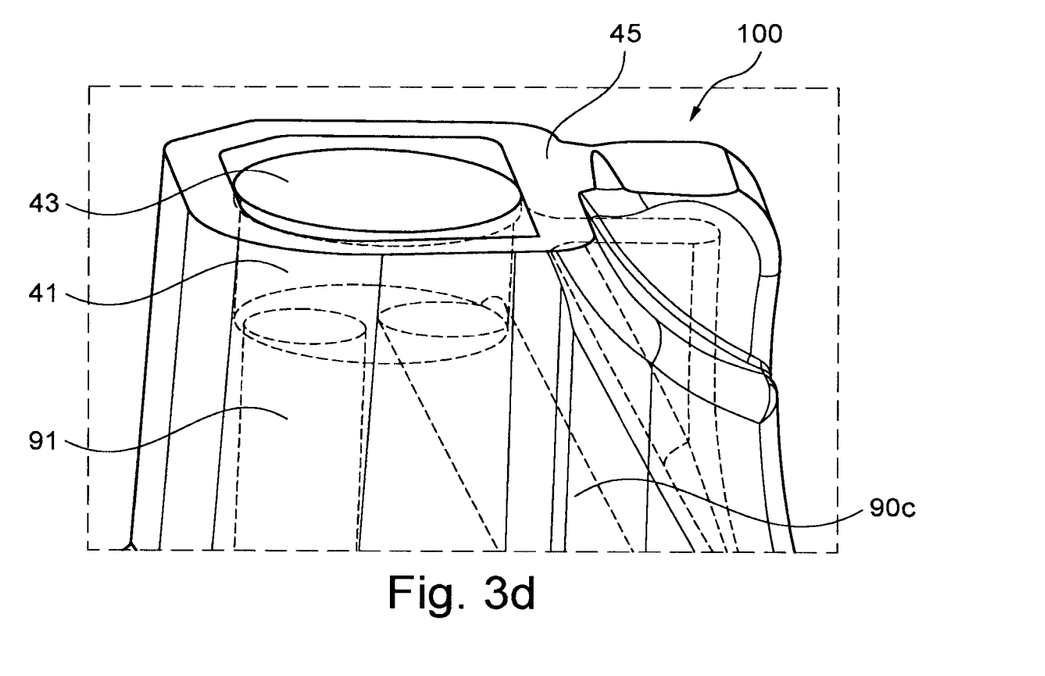

FIG. 3d shows a perspective section of the component from FIG. 2 after a further intermediate step of the method according to the invention for producing the component in an upper partial area.

Subsequent to the state of the component shown in FIG. 3c in the course of the manufacturing method according to the invention, the opening of the fourth cavity 41 on the outer surface 45 has been covered by the covering part 43 adapted to the shoulder 42.

The covering part 43 is configured such that (matching the shoulder 42) it can be inserted into the shoulder 42 to cover the fourth cavity and is positioned there in a form-fitting manner, with one surface of the covering part 42 being slightly recessed with respect to the outer surface 45 of the component.

Thus, a defined termination is formed, on which an additive build-up of the last portion of the component shown in FIG. 2 can take place in the course of the subsequent method steps.

The covering parts used in the course of the method according to the invention, here covering part 43, are preferably selected from a set of prefabricated covering parts geometrically adapted to the standard geometries of the cavities.

Corresponding to the cylindrical geometry of the fourth cavity 41, the covering part 43 has a circular flat geometry adapted thereto and is preferably configured as a thin flat sheet metal blank.

Figure 4:
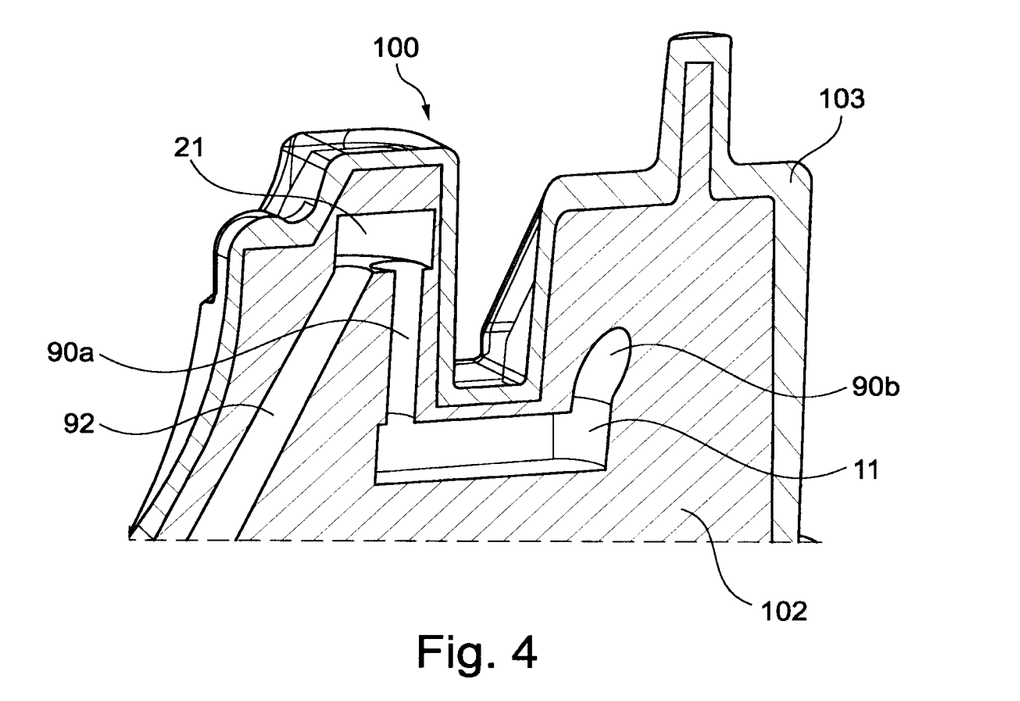
FIG. 4 shows a central partial area of the component shown in FIG. 2 in a perspective cross-sectional view.

FIG. 4 shows a central partial area of the component shown in FIG. 2 in a perspective cross-sectional view.

The illustration shows the different material structure of the component 100 having the cooling channel system.

The component produced in the course of the method according to the invention has a core body 102 made from the build material, in which the cooling channel system is formed.

Furthermore, a wear-resistant outer layer 103 is formed on an outer contour surface of the core body 102 by means of additive integrally bonded application of a further material. The further material has a higher wear resistance than that of the build material from which the core body 102 is formed.

On the other hand, the build material from which the core body 102 is formed preferably has a higher thermal conductivity than the further material from which the wear-resistant outer layer 103 is formed.

The resulting combination advantageously combines the better heat conduction properties of the core body 102, in which the cooling channel system is formed, with the high wear resistance of the wear-resistant outer layer 103.

In a possible embodiment, the thermally conductive build material is copper or a copper alloy and the wear-resistant outer layer is formed from tool steel.

Since the cooling channel system is introduced into the core body 102 in the course of the method according to the invention by means of material-removing machining, the machining effort and the machining costs can also be reduced since the more thermally conductive core body 102, e.g. copper alloy, usually has a lower strength than the further material of the wear-resistant outer layer 103, e.g. tool steel, and thus material-removing machining on the core body is simplified.

Figure 5:
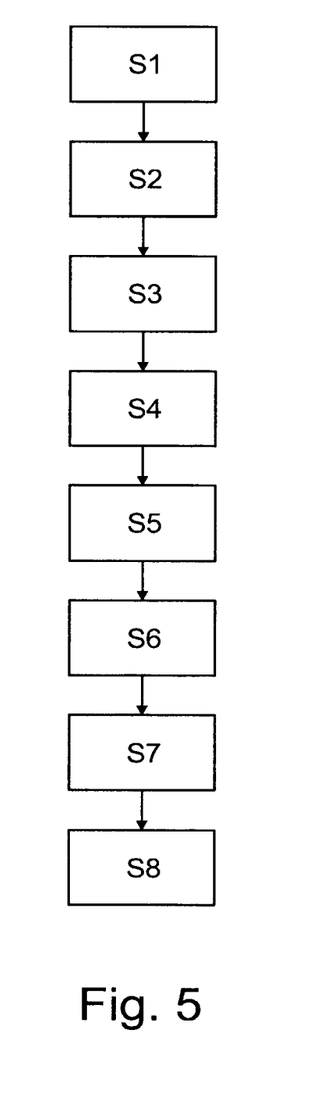
FIG. 5 shows an exemplary embodiment of a method according to the invention for producing a component having a cooling channel system.

An exemplary embodiment of a method according to the invention for producing a component having a cooling channel system is shown schematically in FIG. 5.

In step S1, a first portion of the component is built by means of additive, integrally bonded application of a build material.

In step S2, a first cavity having an opening is introduced into the first portion of the component.

In step S3, the opening of the first cavity in the first portion is partially or completely covered by a covering part.

In step S4, a second portion of the component is built by means of the additive, integrally bonded application of the build material, with the build material being applied on the first portion and at least on the covering part and, if appropriate, additionally on the first portion.

In step S5, a second cavity is introduced into the second portion of the component.

In step S6, a connecting channel is introduced into the component at least in partial sections by means of material-removing machining in order to form the cooling channel system, the connecting channel connecting the second cavity of the second portion to the first cavity of the first portion of the component.

In this exemplary embodiment, the two cavities are introduced by omitting the corresponding areas during the application of material.

The connection channel for connecting the two cavities is introduced by chip-removing machining.

In a particular embodiment of the exemplary embodiment shown, the method also includes step S7, wherein an opening in the second cavity of the second portion created by omitting the corresponding area is also partially or completely covered by a covering part.

In step S8, a further portion of the component is then built by means of the additive, integrally bonded application of a build material, with the build material being applied at least on the covering part of the opening of the second cavity and possibly also on the second portion in order to achieve a better, integrally bonded connection and to ensure a termination of the opening.

As described above, these steps may be repeated further in order to successively build further portions having cavities in this way, which are then subsequently connected by introducing the connecting channels. According to the invention, the connecting channels are at least partially produced by material-removing machining, while according to the invention, the cavity is built at least partially by means of the additive, integrally bonded application of the build material within the scope of the present invention.

Exemplary embodiments of the present invention and advantages thereof have been described in detail above with reference to the attached figures.

However, the present invention is in no way restricted to the exemplary embodiments described above and implementation features thereof and also includes modifications of the exemplary embodiments mentioned, in particular those resulting from modifications and/or combinations of one or more features of the exemplary embodiments described within the scope of the independent claims.

LIST OF REFERENCE SYMBOLS 10 first portion
11 first cavity
12 shoulder at the opening of the first cavity
13 covering part for covering the first cavity
15 outer surface of the first portion
20 second portion
21 second cavity
22 shoulder at the opening of the second cavity
23 covering part for covering the second cavity
25 outer surface of the second portion
26 further outer surface of the second portion
31 third cavity
41 fourth cavity
42 shoulder at opening of fourth cavity
43 covering part for covering the fourth cavity
45 outer surface
90, 90a, 90b, 90c connecting channel
91 feed channel
92 discharge channel
100 component
101 body of the component
102 core body of the component
103 wear-resistant outer layer
Z inlet
A outlet
x build direction

The invention claimed is:

1. A method for producing a component (100) having a cooling channel system, comprising:
using additive manufacturing to build a first portion (10) of the component (100) from a build material,
introducing a first cavity (11) having an opening into the first portion (10) of the component (100) that was built using additive manufacturing,
partially or completely covering the opening of the first cavity (11) in the first portion (10) by means of a covering part (13),
using additive manufacturing to build a second portion (20) of the component (100) from the build material, the build material of the second portion (20) being applied at least to the covering part (13) and, if applicable, additionally to the first portion (10),
introducing a second cavity (21) into said second portion (20) of the component, and
introducing a connecting channel (90; 90a) into the component (100) at least in partial sections by material-removing machining to form the cooling channel system, said connecting channel extending through the covering part (13) and connecting the second cavity (21) of the second portion (20) to the first cavity (11) of the first portion (10) of the component (100).

2. The method according to claim 1, characterized in that introducing the first (11) and/or the second cavity (21) and/or introducing the connecting channel is carried out subsequent to building the respective portions (10; 20) at least in partial sections by material-removing machining.

3. The method according to claim 2, characterized in that the material-removing machining for introducing the first (11) and/or the second cavity (21) and/or the connecting channel is chip-removing machining.

4. The method according to claim 1, characterized in that introducing the first (11) and/or the second cavity (21) and/or introducing the connecting channel is carried out at least in partial sections in the course of building the respective portions (10, 20) by omissions during the additive, integrally bonded application of the build material.

5. The method according to claim 4, characterized in that the surfaces of the portions (10; 20) adjacent to the cavities (11; 21) introduced in the course of building the portions (10; 20) are reworked by chip-removing machining.

6. The method according to claim 1, characterized in that said method further comprises:
partially or completely covering an opening of the second cavity (21) of the second portion (20) by means of a covering part (23), and
using additive manufacturing to build a further portion (30; 40) of the component (100) from the build material, said build material of the further portion (30:40) being applied at least to the covering part (23) of the opening of the second cavity (21) and, if applicable, also to the second portion (20).

7. The method according to claim 6, characterized in that said method further comprises the steps of:
ZS1: introducing further cavities (31; 41) having an opening into one of the previously built portions (10; 20) of the component (100), wherein introducing the further cavity (31; 41) is carried out subsequent to building the previously built portion (10; 20) by material-removing machining or in the course of building the previously built portion (10; 20) by omissions during the additive, integrally bonded application of the build material,
ZS2: introducing one or more connecting channels (90; 90a; 90b; 90c) into the component (100) by material-removing machining to further form the cooling channel system, wherein the connecting channel(s) (90; 90a; 90b; 90c) connect(s) the further cavity (31; 41) from step ZS1 with one or more of the previously introduced cavities (11; 21) in the previously built portions (10; 20) of the component (100),
ZS3: partially or completely covering the opening of the further cavity or cavities (31; 41) from step ZS1 by means of a covering part (43),
ZS4: using additive manufacturing to build one or more further portions of the component (100) from the build material, said build material of the one or more further portions being applied to one or more of the previously built portions and to the covering part (43) of the previous step ZS3.

8. The method according to claim 7, characterized in that the method further comprises:

a plurality of repetitions of the method step sequence ZS1 to ZS4 for producing a component (100) with a plurality of portions (10, 20) and a cooling channel system formed within the component (100) which consists of a plurality of cavities (11; 21; 31; 41) and a plurality of connecting channels (90; 90a; 90b; 90c; 90d) for connecting the plurality of cavities.

9. The method according to claim 1, characterized in that the material-removing machining for introducing the connecting channel(s) (90; 90a; 90b; 90c) is chip-removing machining.

10. The method according to claim 1, characterized in that the additive manufacturing is carried out by build-up welding with a laser or an arc.

11. The method according to claim 10, characterized in that the build material is supplied in the form of powder and/or wire.

12. The method according to claim 1, characterized in that, in an area around the opening(s) of one or more of the cavities (11; 21; 31; 41) in the respective portions, recessed shoulders (12; 22; 42) adapted by material-removing machining to the geometries of the covering parts (13; 23; 43) configured to cover the respective openings are formed such that the respective covering parts (13; 23; 43 for covering the respective openings are form-fittingly held in position.

13. The method according to claim 12, characterized in that one or more of said covering parts (13; 23; 43) are round sheet metal blanks or sheet metal covers.

14. The method according to claim 1, characterized in that geometries of said cavities (11; 21; 31; 41) are selected from a set of predetermined standard geometries of the cavities.

15. The method according to claim 14, characterized in that the standard geometries of the cavities have generally cylindrical shapes.

16. The method according to claim 14, characterized in that said covering parts (13; 23; 43) are selected from a set of prefabricated covering parts geometrically adapted to the standard geometries of the cavities.

17. The method according to claim 1, characterized in that said method further comprises:

introducing at least one feed channel (91) and at least one discharge channel (92) for the cooling channel system into the component (100) by means of material-removing machining, said feed channel (91) and said discharge channel (92) being introduced in such a way that the cooling channel system extends continuously from said feed channel (91) to said discharge channel (92).

18. The method according to claim 1, characterized in that said method further comprises:

additive, integrally bonded application of different materials with different wear resistance than the build material of the built component (100).

19. The method according to claim 18, characterized in that the build material around the cooling channel has a thermal conductivity that is greater than a thermal conductivity of a wear-resistant outer layer (103).

20. A software-supported computer system, characterized in that said computer system is configured for construction planning of a component (100) to be produced by the method according to claim 1 and comprises for this purpose at least: means for defining a component geometry of the component (100) having a cooling channel system, by selecting a geometry of a cooling channel portion from a group of predefined, geometrically predetermined cavities.

21. The software-supported computer system according to claim 20, characterized in that said computer system further comprises:

means for determining successive machining steps that can be carried out by a numerically controlled machine tool and/or a numerically controlled machining center for the production of the component (100)

means for deriving control commands to be used by the numerically controlled machine tool and/or the numerically controlled machining center for carrying out the machining steps means for transmitting the control commands to the machine tool and/or the machining center, which are configured to carry out the machining steps for producing the component (100).

22. The software-supported computer system according to claim 20, characterized in that said computer system comprises a CAD and/or a CAM system.

* * * * *